US009243662B2

(12) United States Patent
Bonat

(10) Patent No.: US 9,243,662 B2
(45) Date of Patent: Jan. 26, 2016

(54) TOOTH-BEARING BODY

(71) Applicant: FULTERER Gesellschaft mbH, Lustenau (AT)

(72) Inventor: Gunter Bonat, Lochau (AT)

(73) Assignee: FULTERER GESELLSCHAFT MBH, Lustenau (AT)

( * ) Notice: Subject to any disclaimer, the term of this patent is extended or adjusted under 35 U.S.C. 154(b) by 0 days.

(21) Appl. No.: 14/387,289

(22) PCT Filed: Feb. 15, 2013

(86) PCT No.: PCT/AT2013/000028
§ 371 (c)(1),
(2) Date: Sep. 23, 2014

(87) PCT Pub. No.: WO2013/138827
PCT Pub. Date: Sep. 26, 2013

(65) Prior Publication Data
US 2015/0055897 A1 Feb. 26, 2015

(30) Foreign Application Priority Data
Mar. 23, 2012 (AT) ................................. A 360/2012

(51) Int. Cl.
F16C 29/04 (2006.01)
A47B 88/08 (2006.01)
F16C 33/36 (2006.01)
F16C 33/58 (2006.01)

(52) U.S. Cl.
CPC .................. *F16C 29/04* (2013.01); *A47B 88/08* (2013.01); *F16C 33/363* (2013.01); *F16C 33/585* (2013.01); *A47B 2210/0064* (2013.01); *A47B 2210/0078* (2013.01); *F16C 2314/72* (2013.01)

(58) Field of Classification Search
CPC .......................... A47B 88/10; A47B 2210/0059
USPC ............. 312/330.1, 331, 334.1, 334.7, 334.8, 312/334.13, 334.32
See application file for complete search history.

(56) References Cited

U.S. PATENT DOCUMENTS

| 1,067,404 | A | * | 7/1913 | Callaghan | 312/331 |
| 6,641,239 | B2 | * | 11/2003 | Kaiser | A47B 88/04 312/331 |
| 8,408,663 | B2 | * | 4/2013 | Chellappan | F25D 25/025 312/331 |
| 2004/0046488 | A1 | * | 3/2004 | Hogan | E05D 15/58 312/322 |

(Continued)

FOREIGN PATENT DOCUMENTS

| DE | 102005016418 | 11/2005 |
| WO | 02095171 | 11/2002 |

(Continued)

*Primary Examiner* — Matthew Ing
(74) *Attorney, Agent, or Firm* — Volpe and Koenig, P.C.

(57) ABSTRACT

A tooth-bearing body having a first sequence (1) of teeth (2) and at least one second sequence (3) of teeth (4), wherein the teeth (2) of the first sequence (1), viewed in a rolling direction (5) of the tooth-bearing body, are arranged behind one another and the teeth (4) of the second sequence (3), viewed in the rolling direction (5) of the tooth-bearing body, are likewise arranged behind one another, and the first sequence (1) of teeth (2) and the second sequence (3) of teeth (4) are arranged in a transverse direction (6) orthogonal to the rolling direction (5), particularly exclusively next to one another, wherein the teeth (2) of the first sequence (1) are larger than the teeth (4) of the second sequence (3).

13 Claims, 6 Drawing Sheets

(56) References Cited

U.S. PATENT DOCUMENTS

| | | |
|---|---|---|
| 2004/0099077 A1 | 5/2004 | Weis |
| 2005/0160854 A1* | 7/2005 | Rotter .................. F25D 25/025 74/422 |
| 2008/0314067 A1* | 12/2008 | Lee ........................ F25D 5/025 62/441 |
| 2010/0037715 A1 | 2/2010 | Gasser |
| 2011/0210655 A1 | 9/2011 | Brown et al. |

FOREIGN PATENT DOCUMENTS

| | | |
|---|---|---|
| WO | 2007007950 | 1/2007 |
| WO | 2008128256 | 10/2008 |

* cited by examiner

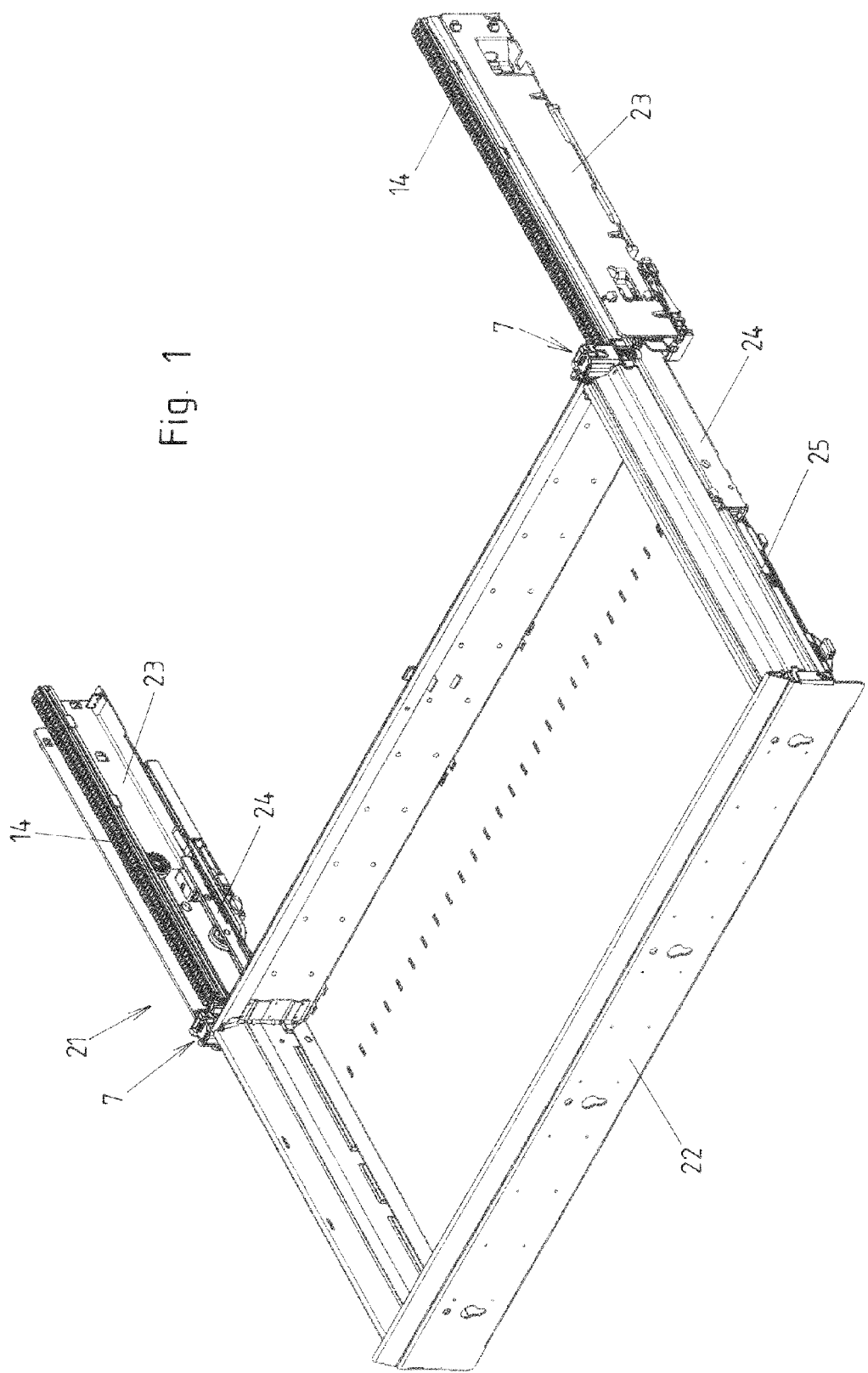

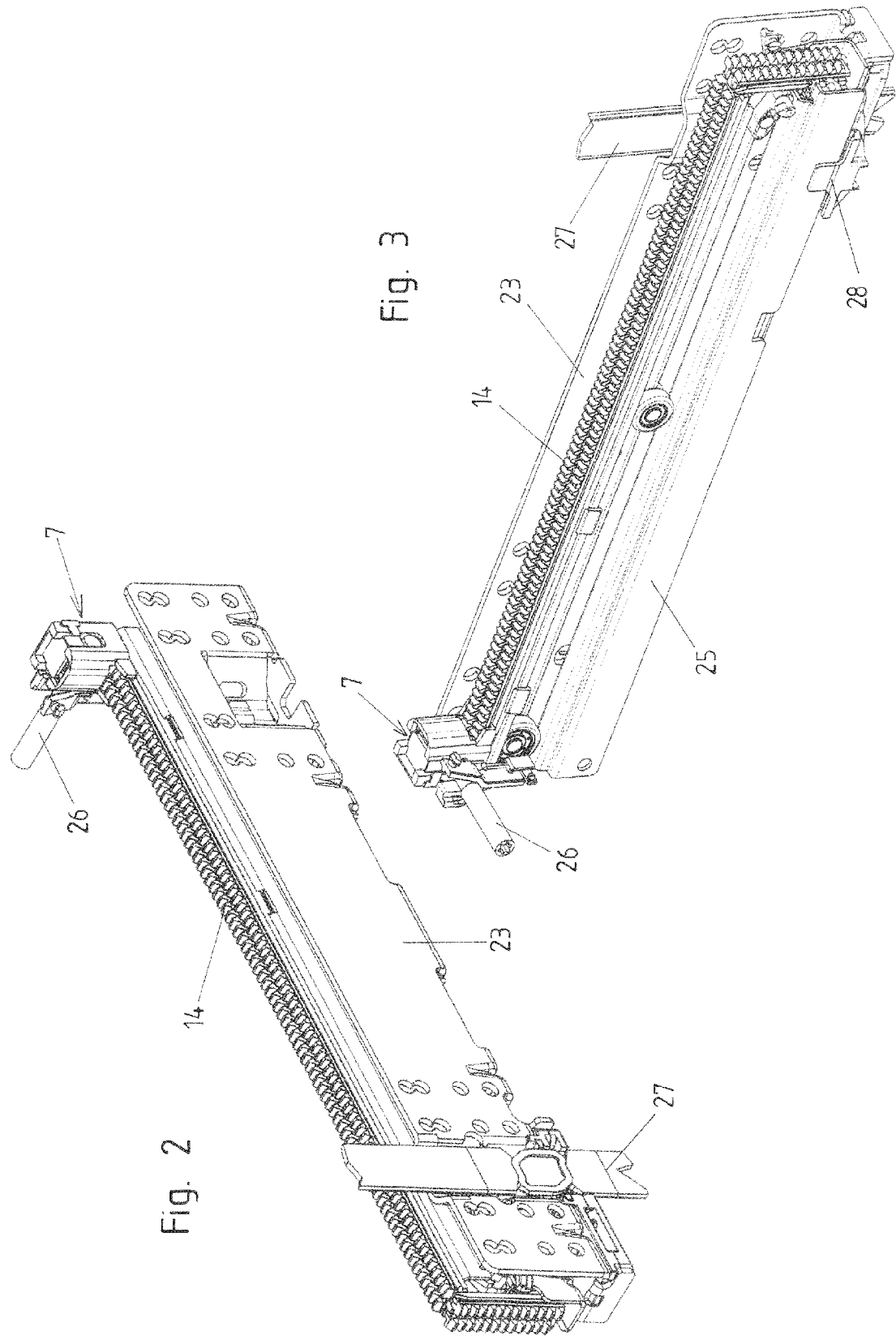

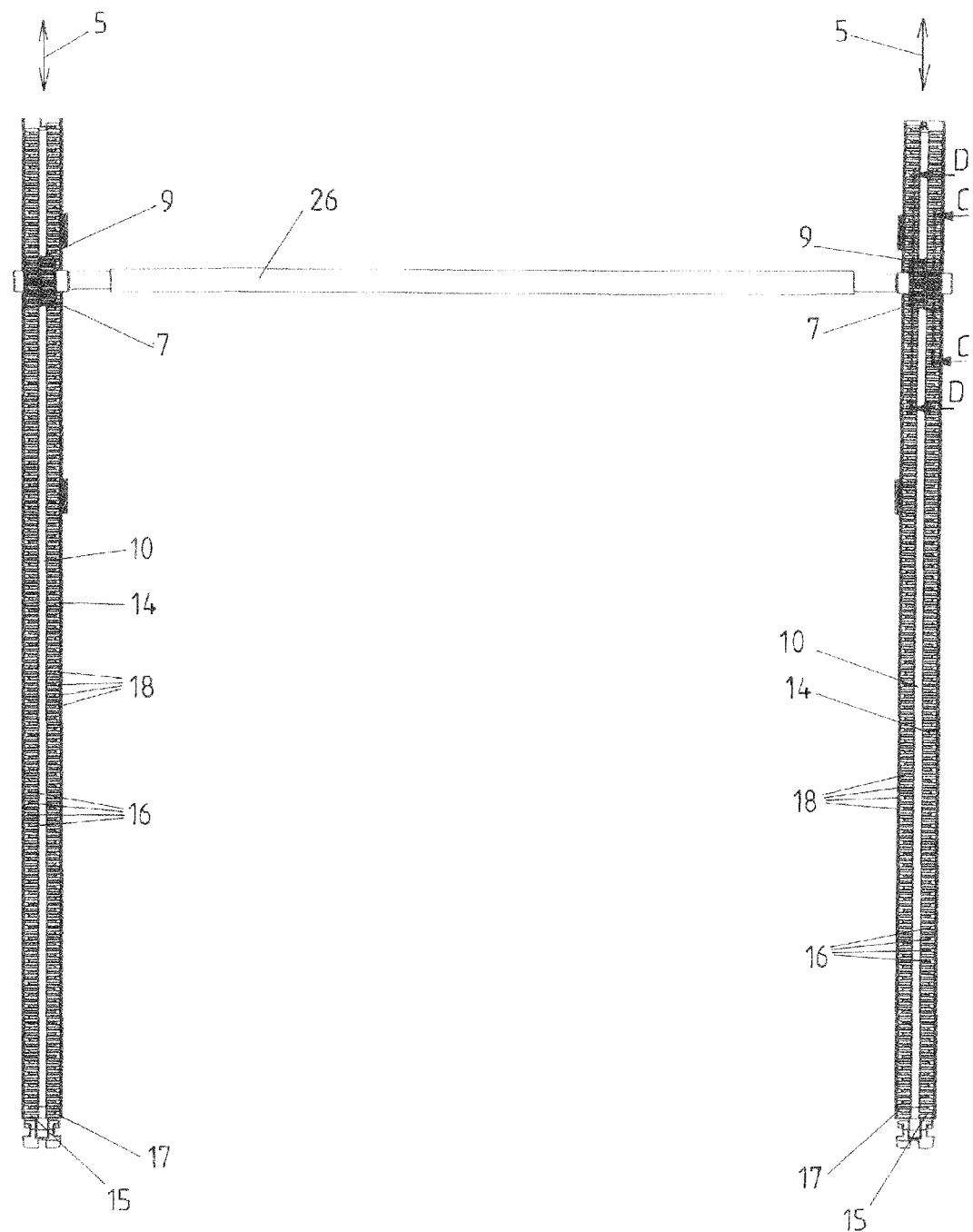

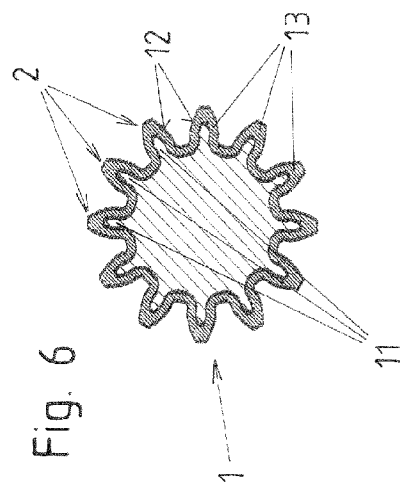
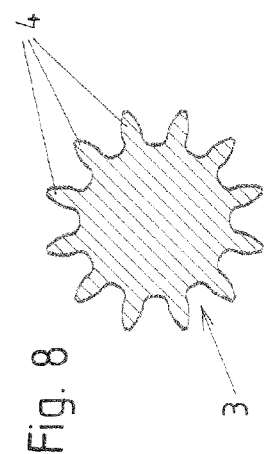
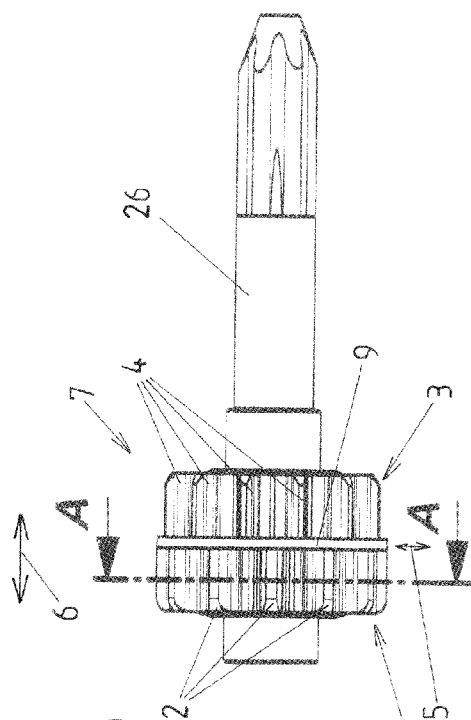
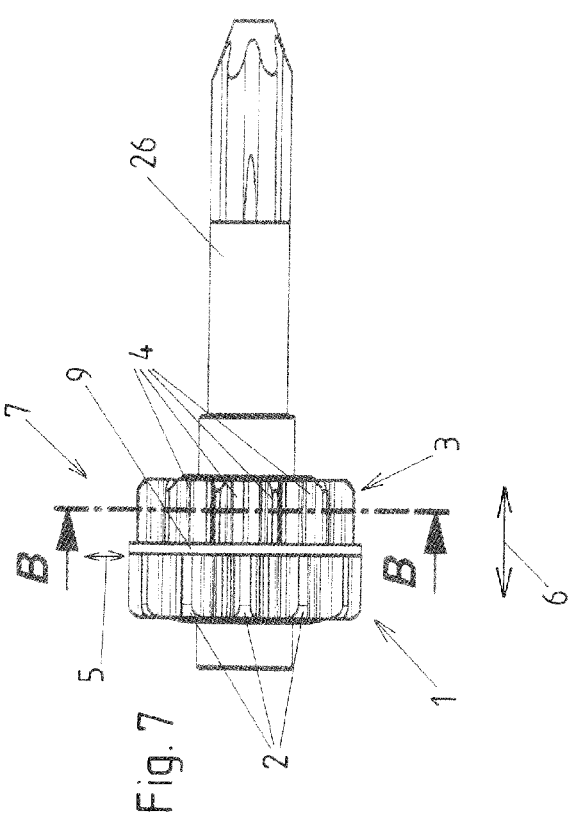

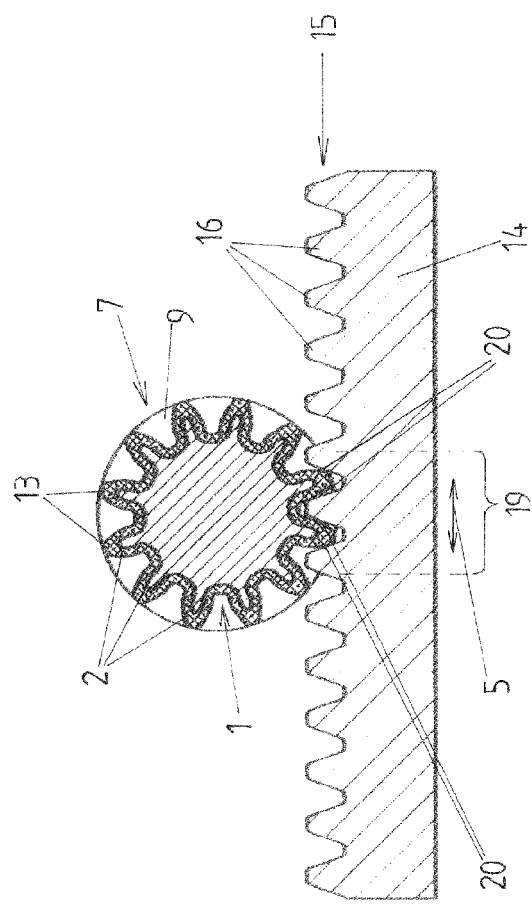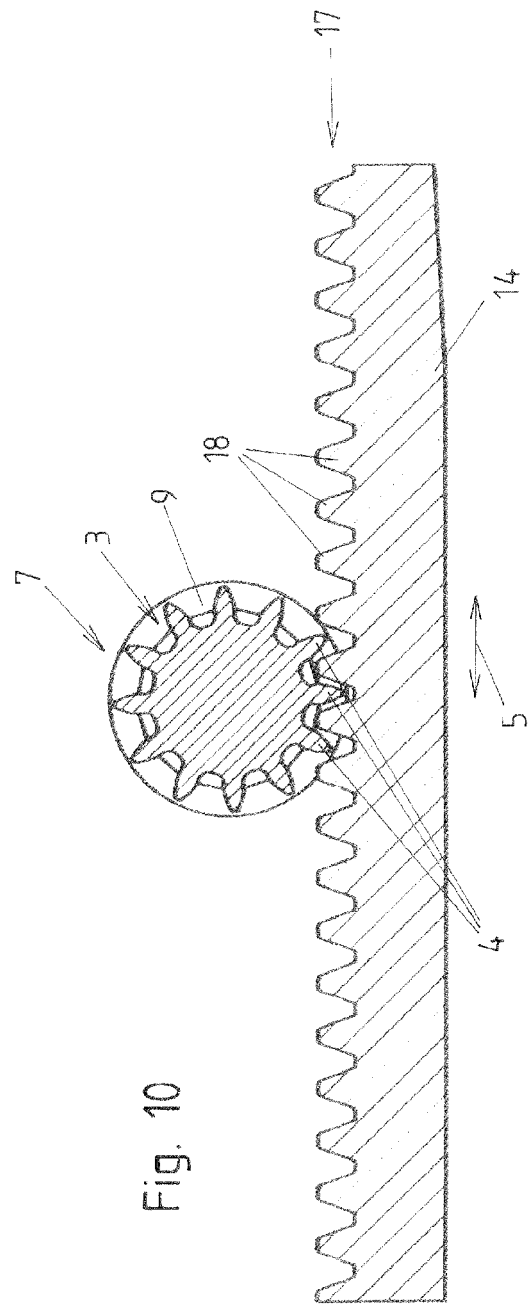

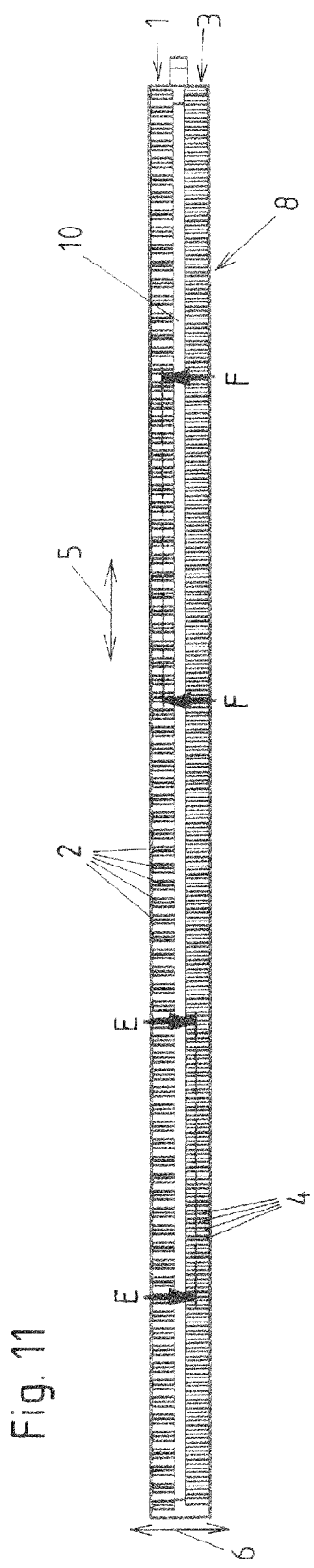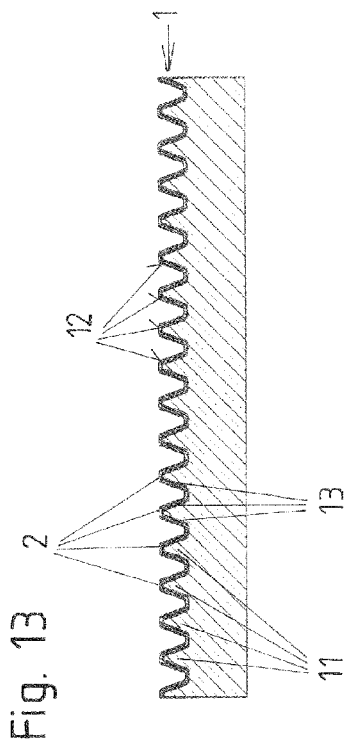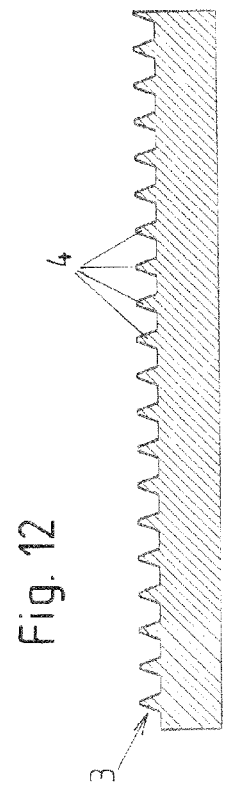

TOOTH-BEARING BODY

BACKGROUND

The present invention relates to a tooth-bearing body having a first sequence of teeth and at least one second sequence of teeth, wherein the teeth of the first sequence, when viewed in a rolling direction of the tooth-bearing body, are arranged one behind another and the teeth of the second sequence, when viewed in the rolling direction of the tooth-bearing body, are also arranged one behind another and the first sequence of teeth and the second sequence of teeth are arranged in a transverse direction that is orthogonal to the rolling direction, in particular exclusively, next to one another.

So-called double teeth systems in the form of tooth-bearing bodies with two sequences of teeth are known in the prior art. They are used, for example, in furniture fittings and in particular in the case of pull-out devices for movable furniture parts to synchronize the running of different rail arrangements with one another or to transmit a blocking function applied by means of a blocking mechanism onto the one rail arrangement of such a pull-out device also to the rail arrangement on the other side of the movable furniture part. The teeth of the first sequence, as a rule, are arranged offset to the teeth of the second sequence in the rolling direction, as a result of which one of the sequences is always completely engaged.

SUMMARY

It is the object of the invention to provide an alternative type of development form of tooth-bearing body of the above-mentioned type which makes a high degree of smooth running and reliability available.

This is achieved according to the invention by the teeth of the first sequence being larger than the teeth of the second sequence.

A basic concept of the invention is consequently that the larger teeth of the first sequence are of such a size that they engage permanently in a corresponding first sequence of another or further tooth-bearing body, whilst the teeth of the second sequence, as a result of their smaller realization, in normal operation in which only the forces which occur usually in normal operation are active, run along idle without having any contact with teeth of a second sequence of the further tooth-bearing body. The teeth of the second sequence of the tooth-bearing body according to the invention are only used in contact with the noted counter toothing when, in the event of an operating error, such forces occur that the blocking function of the teeth of the second sequence is required. The noise level in normal operation is also reduced as a result of this measure as the teeth of the second sequence actually run along idle in practice and consequently do not give rise to any noise.

Along with the tooth-bearing body according to the invention, the invention also relates to an arrangement having at least one tooth-bearing body according to the invention and at least one further tooth-bearing body which also comprises a first sequence of teeth and at least one second sequence of teeth, wherein the teeth of the first sequence of the tooth-bearing body engage with the teeth of the first sequence of the further tooth-bearing body in an engagement region and the teeth of the two first sequences which are each engaged with one another are in contact at at least one contact point, whilst the teeth of the second sequence of the tooth-bearing body are arranged completely contact-free between the teeth of the second sequence of the further tooth-bearing body in at least one operating state. This describes the state, preferably in the normal load case, in which there is simply no contact between the second sequences of teeth. In the case of improper use or overload, in contrast, the teeth of the second sequences of the tooth-bearing body according to the invention and of the further tooth-bearing body can come into contact with one another in order to ensure the required blocking function.

In terms of providing as low of a noise development as possible, preferred embodiments of the invention provide that the teeth of the first sequence in each case comprise a tooth core and at least one tooth casing which encases said tooth core and realizes an outside surface of the respective tooth, wherein the tooth casing is realized in a softer manner than the tooth core. In normal operation then, only the teeth of the first sequence with their soft tooth casing can be in contact with the teeth of the first sequence of the further tooth-bearing body. In this context, it is then favorable in terms of the named blocking function when the teeth of the second sequence are realized in a harder manner than the tooth casings of the teeth of the first sequence.

For the sake of completeness, it is pointed out that the rolling direction is the direction in which the tooth-bearing body according to the invention rolls or returns in normal operation along a further tooth-bearing body which is provided for this purpose. It is further pointed out that the first sequence of teeth and the second sequence of teeth are arranged side by side in the transverse direction—that is orthogonally with respect to the rolling direction. They are preferably arranged exclusively side by side, which means that the sequences are arranged so as not to overlap or so as not to engage in one another.

A first type of tooth-bearing bodies according to the invention provides that the tooth-bearing body is a toothed wheel and the rolling direction is the circumferential direction of the toothed wheel in which the toothed wheel rolls over its teeth. However, it is also possible just as well for the tooth-bearing body to be a toothed rod and the rolling direction to be the direction in which a toothed wheel as a further tooth-bearing body rolls along the toothed rod.

Preferred development forms provide that, when viewed in the rolling direction, the teeth of the first sequence are arranged equidistantly with respect to one another. It is also favorable when viewed in the rolling direction, for the teeth of the second sequence to be arranged equidistantly with respect to one another. The term equidistant arrangement, in this case, is to be understood as within the sequence each tooth being at the same distance to the front and rear tooth as the other teeth. The teeth of the first sequence and the teeth of the second sequence, when viewed in the rolling direction, can be arranged offset with respect to one another. For example, it is possible in this context for the teeth of the second sequence, when viewed in the rolling direction, to be arranged at the point where a corresponding recess is additionally arranged between two teeth of the first sequence. Particularly preferred development forms of the invention provide that, when viewed in the rolling direction, each of the consecutive teeth of the first sequence are spaced apart from one another by the same distance as, when viewed in the rolling direction, each of the consecutive teeth of the second sequence are spaced apart from one another. The two sequences can be arranged side by side directly adjacent one another on the tooth-bearing body according to the invention. However, preferred development forms provide that, when viewed in the transverse direction, at least one intermediate web which separates the sequences from one another or at least one intermediate groove which separates the sequences from one another is arranged between the first sequence of teeth and the second sequence of teeth.

Along with the tooth-bearing body per se, the invention also relates to a pull-out device for a movable furniture part, in particular to a drawer pull-out device, having at least one tooth-bearing body according to the invention or at least one above-mentioned arrangement according to the invention.

The tooth-bearing body or arrangements according to the invention can be provided in such pull-out devices for synchronizing the pull-out movement of at least two rail arrangements which are arranged at a spacing from one another. Two tooth-bearing bodies according to the invention can be connected to one another in a rigid manner, for example by means of a shaft. It can also be provided that using tooth-bearing bodies according to the invention a blocking function is transmitted from one rail arrangement arranged on one side of the movable furniture part to a rail arrangement which is arranged on the opposite side of the movable furniture part.

BRIEF DESCRIPTION OF THE DRAWINGS

Further features and details of preferred development forms of the invention are explained as an example by way of the following description of the figures, in which:

FIG. 1 shows a pull-out device for a movable furniture part where tooth-bearing bodies according to the invention are used;

FIGS. 2 and 3 show the possibility of combining the pull-out device according to FIG. 1 with a locking system;

FIG. 4 shows the toothed rods and the toothed wheels according to the invention, which are connected by means of a shaft, of the embodiment according to FIG. 1;

FIGS. 5 to 8 show representations of a toothed wheel which is realized according to the invention;

FIGS. 9 and 10 show sections CC and DD from FIG. 4; and

FIGS. 11 to 13 show representations of an exemplary embodiment according to the invention of a toothed rod.

DETAILED DESCRIPTION OF THE PREFERRED EMBODIMENTS

FIG. 1 shows a pull-out device 21 for a movable furniture part 22 in the form of a drawer. The exemplary embodiment shown is consequently a drawer pull-out device. This device comprises along with the drawer in the form of the movable furniture part 22 also rail arrangements which are arranged on both sides of the drawer 22 and by way of which the movable furniture part 22 or the drawer is able to be pushed in and pulled out. Each of the rail systems comprises a body rail 23 which, as a rule, is fastened on the furniture body. On the movable furniture part 22 or on the drawer itself there is the so-called load rail 25. Body rail 2 and load rail 25 are, as is known per se, connected together by means of a central rail 24. The exemplary embodiment shown is a so-called full extension. Naturally, the invention can also be realized for standard pull-outs without a central rail 24. To synchronize the push-in and pull-out movements of the two named rail systems, a further tooth-bearing body 14 is situated and secured on each body rail 23. These further tooth-bearing bodies 14 are realized in FIG. 1 in each case as a toothed rod each with two sequences 15 and 17 of teeth 16 and 18. A tooth-bearing body 7 according to the invention, in the form of the toothed wheels 7 which are hidden in FIG. 1 and consequently not directly visible but are shown in the other figures, engages in each of said toothed rods 14. These toothed wheels 7, as can be seen particularly well in FIG. 4, are connected together in a non-rotatable manner by means of the connecting shaft 26, which leads to synchronization of the sequence of the toothed wheels 7 on the toothed rods 14 in the rolling directions 5. As a result of the connecting shaft 24, each of the toothed wheels 7 is then only able to roll along the toothed rod 14 associated therewith when the other toothed wheel 7 also does this on the other toothed rod 14. FIGS. 2 and 3 show views in each case of a rail arrangement according to FIG. 1, a locking system with the locking rod 27 about the locking body 28 additionally being provided. As is known per se, the locking body 28 is able to be actuated by means of the locking rod 27. It can be adjusted between an engagement position and a release position by means of the locking rod 27. If the locking body 28 is situated in the engagement position, the load rail 25 and consequently the entire movable furniture part 22 cannot be pulled out of the body rail 23. This blocking action can be transmitted from the rail arrangement shown in FIGS. 2 and 3, by means the toothed wheels 7 according to the invention which are used here and the connecting shaft 26 which connects them rigidly together, to the rail arrangement on the other side of the movable furniture part 22 such that the movable furniture part 22 is not able to be pulled out a bit far on one side and then become jammed. Suitable locking systems are known in the prior art and do not have to be explained further here.

FIG. 4 now shows, in isolation from other components of the pull-out device, the two tooth-bearing bodies 7 according to the invention which are realized as toothed wheels, how they are rigidly connected together by means of the connecting shaft 26 and are able to roll in the rolling directions 5 along a further tooth-bearing body 14 which is realized in each case as a toothed rod. The further tooth-bearing bodies 14 comprise in each case a first sequence of teeth 16 and a second sequence of teeth 18. The teeth 16 and 18 of said two sequences 15 and 17 are in each case the same size and are arranged equidistantly with respect to one another. Between the two sequences 15 and 17 of the teeth 16 and 18 of the further tooth-bearing body 14 there is the intermediate groove 10, in which in each case the intermediate web 9 of the toothed wheels 7 is able to engage. In FIGS. 5 and 7, the tooth-bearing bodies according to the invention of said exemplary embodiment are now shown in an enlarged manner in the form of the toothed wheels 7. The connecting shaft 26, in said embodiment, at the same time forms the axial shaft about which the toothed wheels 7 are able to rotate in the rolling directions 5. In each case, the first sequence 1 of teeth 2 and the second sequence 3 of teeth 4 can easily be seen. The teeth 2 or 4 of the respective sequence 1 or 3, when viewed in the rolling direction 5 of the tooth-bearing body, 7, are arranged in each case one behind another. In the transverse direction 6—that is orthogonally with respect to the rolling direction 5—the first sequence 1 of teeth 2 and the second sequence 3 of teeth 4 are arranged exclusively side by side in this exemplary embodiment. Consequently there is no overlap in the transverse direction between the first sequence 1 and the second sequence 3. Situated between the two sequences 1 and 3 is the intermediate web 9 which consequently also separates the two sequences 1 and 3 from one another.

FIG. 6 shows the section along the line of intersection AA which is shown in FIG. 5 on the toothed wheel 7—that is the section through the larger teeth 2 of the first sequence 1. FIG. 8 shows a corresponding section along the line of intersection BB from FIG. 7 through the smaller teeth 4 of the second sequence 3. The difference in the size of the teeth 2 and 4 can easily be seen when comparing the sectional representations according to FIGS. 6 and 8. It can also easily be seen in FIG. 6 that the teeth 2 of the first sequence 1 comprise in each case a tooth core 11 which is encased by means of a tooth casing 13. The tooth casings 13 forms in each case the outer surface 12 of the respective tooth 2 of the first sequence 1. In terms of particularly good smooth running, as already outlined in the introduction, the tooth casing 13 is realized in a softer manner than the tooth core 11. It is provided in a particularly preferred manner that the teeth 4 of the second sequence 3 are likewise realized in a harder manner than the tooth casings 13 of the teeth 2 of the first sequence 1.

Tooth-bearing bodies according to the invention, whether in the form of toothed wheels 7 or the toothed rods 8 which are also shown further below, can be produced from the most varied materials and material combinations. Realization in plastics material is particularly favorable. If different materials are used, this can be plastics materials with different hardnesses. The plastics material toothed wheels can be produced in a particularly favorable manner using injection molding, where applicable multi-component injection molding.

The various interaction between the teeth 2 and 4 of the tooth-bearing body 7 according to the invention, which is realized here as a toothed wheel, and the teeth 16 and 18 of the further tooth-bearing body 14, which is realized here as a toothed rod, is shown by way of FIGS. 9 and 10. FIG. 9 shows a section through the first sequence 1 of the larger teeth 2 along the line of intersection CC from FIG. 4. FIG. 10 shows the section along the line of intersection DD from FIG. 4—that is the section through the smaller teeth 4 of the second sequence 3 of the toothed wheel 7 which is realized according to the invention. It can easily be seen in FIG. 9 how the teeth 2 of the first sequence 1 of the toothed wheel 7 realized according to the invention engage in the engagement region 19 with the teeth 16 of the first sequence 15 of the toothed rod 14. The teeth 2 and 16 of the two first sequences 1 and 15 which mesh together touch each other at the contact points 20 in the engagement region 19. FIG. 10, in contrast, shows how the teeth 4 of the second sequence 3 of the toothed wheel 7 according to the invention are arranged in a completely contact-free manner between the teeth 18 of the second sequence 17 of the further tooth-bearing body 14 here in the form of the toothed rod in the normal operating state shown here. In the normal operating state shown here where no extraordinary forces occur, the teeth 4 of the second sequence 3 of the toothed wheel 7 according to the invention consequently do not contact the teeth 18 of the second sequence 17 of the toothed rod 14 at all. Only in an overload case in which the softer tooth casings 13 of the teeth 2 of the first sequence 1 are deformed in a correspondingly severe manner, do the teeth 4 of the second sequence 3 of the toothed wheel according to the invention engage with the teeth 18 of the second sequence 17 of the toothed rod 14 and then realize their blocking function. It must also be pointed out concerning the toothed rod or the further tooth-bearing body 14 that in this case the teeth 16 and 18 of the first and second sequences 15 and 17 are realized in an equidistant manner and are the same size, as can be seen in FIGS. 9 and 10. The teeth 16 and 18, however, are offset with respect to one another by the same amount as the teeth 4 and 2 of the toothed wheel 7 according to the invention.

In the case of the exemplary embodiment depicted up to now, the tooth-bearing body according to the invention is realized as toothed wheel 7 and the further tooth-bearing body which interacts therewith and is not realized according to the invention is realized as toothed rod 14. This can naturally also be realized the other way around as is shown as an example by way of FIGS. 11 to 13. In this exemplary embodiment the tooth-bearing body according to the invention is the toothed rod 8. Here, the teeth 4 of the second sequence 3 are smaller than the teeth 2 of the first sequence 1 in the case of said toothed rod 8. The toothed wheel 14 which corresponds thereto is not shown, but can be realized as known in the prior art. FIG. 11 shows a top view of the toothed rod 8 which is realized according to the invention. FIG. 12 shows the section EE from FIG. 11 through the smaller teeth 4 or the second sequence 3. FIG. 13 shows the section FF through the first sequence 1—that is the larger teeth 2 which are realized, as also in the other exemplary embodiment, in each case from a tooth core 11 and a softer tooth casing 13. As a result of interaction between a toothed wheel 14, which is not shown here and is known per se in the prior art, where the teeth 2 of the first sequence 1 and the teeth 4 of the second sequence 3 are realized with the same size, the same effect is obtained as in the case of the first exemplary embodiment where the toothed wheel 7 is realized according to the invention.

KEY TO THE REFERENCE NUMERALS

1 First sequence
2 Teeth
3 Second sequence
4 Teeth
5 Rolling direction
6 Transverse direction
7 Toothed wheel
8 Toothed rod
9 Intermediate web
10 Intermediate groove
11 Tooth core
12 Outer surface
13 Tooth casing
14 Further tooth-bearing body
15 First sequence
16 Tooth
17 Second sequence
18 Tooth
19 Engagement region
20 Contact point
21 Pull-out device
22 Movable furniture part
23 Body rail
24 Central rail
25 Load rail
26 Connecting shaft
27 Locking rod
28 Locking body

The invention claimed is:

1. An arrangement comprising:
at least one tooth-bearing body comprising a first sequence of teeth and at least one second sequence of teeth, the teeth of the first sequence of the tooth-bearing body, when viewed in a rolling direction of the tooth-bearing body, are arranged one behind another and the teeth of the at least one second sequence of the tooth-bearing body, when viewed in the rolling direction of the tooth-bearing body, are also arranged one behind another and the first sequence of teeth of the tooth-bearing body and the second sequence of teeth of the tooth-bearing body are arranged side by side in a transverse direction that extends orthogonally with respect to the rolling direction, and the teeth of the first sequence of the tooth-bearing body are larger than the teeth of the second sequence of the tooth-bearing body; and
at least one further tooth-bearing body which also comprises a first sequence of teeth and at least one second sequence of teeth, the teeth of the first sequence of the tooth-bearing body engage with the teeth of the first sequence of the further tooth-bearing body in an engagement region and the teeth of the two first sequences which are in each case engaged with one another are in contact at at least one contact point, and the teeth of the second sequence of the tooth-bearing body are arranged completely contact-free between the teeth of the second sequence of the further tooth-bearing body in at least one operating state.

2. The arrangement as claimed in claim 1, the tooth-bearing body is a toothed wheel and the rolling direction is a circumferential direction of the toothed wheel in which the toothed wheel rolls over the teeth.

3. The arrangement as claimed in claim 1, wherein the tooth-bearing body is a toothed rod and the rolling direction is a direction in which a toothed wheel rolls along the toothed rod.

4. The arrangement as claimed in claim 1, wherein, when viewed in the rolling direction, the teeth of the first sequence of the tooth-bearing body are arranged equidistantly with respect to one another.

5. The arrangement as claimed in claim 1, wherein, when viewed in the rolling direction, consecutive ones of the teeth of the first sequence of the tooth-bearing body are spaced apart from one another by a same distance as, when viewed in the rolling direction, consecutive ones of the teeth of the second sequence of the tooth-bearing body.

6. The arrangement as claimed in claim 1, wherein, when viewed in the transverse direction, at least one intermediate web which separates the first and the second sequences of teeth of the tooth-bearing body from one another or at least one intermediate groove which separates the first and the second sequences of teeth of the tooth-bearing body from one another is arranged between the first sequence of teeth of the tooth-bearing body and the second sequence of teeth of the tooth-bearing body.

7. The arrangement as claimed in claim 1, wherein the teeth of the first sequence of the tooth-bearing body in each case comprise a tooth core and at least one tooth casing which encases said tooth core and provides an outside surface of the respective tooth, and the tooth casing is formed of a softer manner than the tooth core.

8. The arrangement as claimed in claim 7, wherein the teeth of the second sequence of the tooth-bearing body are realized in a harder manner than the tooth casings of the teeth of the first sequence.

9. A pull-out device for a movable furniture part comprising at least one arrangement as claimed in claim 1.

10. The arrangement as claimed in claim 1, wherein, when viewed in the rolling direction, the teeth of the second sequence of the tooth-bearing body are arranged equidistantly with respect to one another.

11. The arrangement as claimed in claim 1, wherein the teeth of the first and second sequence of the further tooth-bearing body are arranged equidistantly with respect to one another and of the same size.

12. The arrangement as claimed in claim 1, wherein the teeth of the first sequence of the tooth-bearing body and the teeth of the second sequence of the tooth-bearing body, when viewed in the rolling direction, are arranged offset with respect to each other.

13. The arrangement as claimed in claim 1, wherein the teeth of the second sequence of the tooth-bearing body, when viewed in the rolling direction, are arranged at the point where a corresponding recess is additionally arranged between two teeth of the first sequence of the tooth-bearing body.

* * * * *